US 6,580,265 B1

(12) United States Patent
Reichl et al.

(10) Patent No.: US 6,580,265 B1
(45) Date of Patent: Jun. 17, 2003

(54) MEASURING TRAVEL INSTRUMENT WITH LOW-FRICTIONAL SLIDEABLE MAGNET

(75) Inventors: Asta Reichl, Stuttgart (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/958,563

(22) PCT Filed: Apr. 17, 2000

(86) PCT No.: PCT/DE00/01210

§ 371 (c)(1),
(2), (4) Date: Feb. 26, 2002

(87) PCT Pub. No.: WO00/63651

PCT Pub. Date: Oct. 26, 2000

(30) Foreign Application Priority Data

Apr. 17, 1999 (DE) .................................. 199 17 464

(51) Int. Cl.[7] ............................................... G01B 7/14
(52) U.S. Cl. ............................. 324/207.24; 324/207.22
(58) Field of Search ..................... 324/207.24, 207.2, 324/207.22, 232, 235, 239, 260, 262; 338/32 H, 32 R; 335/205, 209; 73/865.9

(56) References Cited

U.S. PATENT DOCUMENTS 5,514,961 A * 5/1996 Stoll et al. ............. 324/207.13
5,532,585 A * 7/1996 Oudet et al. ........... 324/207.22
6,215,299 B1 * 4/2001 Reynolds et al. ........ 324/207.2

FOREIGN PATENT DOCUMENTS

DE     197 38 316 A    3/1999
EP       0 907 068 A    4/1999

* cited by examiner

Primary Examiner—Edward Lefkowitz
Assistant Examiner—Subhash Zaveri
(74) Attorney, Agent, or Firm—Michael J. Striker

(57) ABSTRACT

A measuring travel instrument has a frame composed of a permeable material, a magnet situated inside the frame in a movable fashion, a magnetosensitive sensor situated in a slot of the frame that is situated in a closed magnetic circuit in such a fashion that a size of a magnetic flux of the magnet changes in it depending on a position of the magnet, a sled composed of a magnetically impermeable material and executing a sliding movement, the magnet being located in the sled, a guide member extending through a recess in the frame and connecting the sled with a component a movement of which is to be determined, the guide member composed of a permeable material and arranged in such a way that it forms a part of the frame conducting the magnetic flux of the magnet.

9 Claims, 5 Drawing Sheets

MEASURING TRAVEL INSTRUMENT WITH LOW-FRICTIONAL SLIDEABLE MAGNET

BACKGROUND OF THE INVENTION

The invention is based on a measuring instrument. A sensor is made known in DE 29 23 644 C2 that comprises a cylindrical frame produced out of ferromagnetic material. A permanent magnet is cylindrical frame produced out of ferromagnetic material. A permanent magnet is moved in sliding fashion in the frame, the movement of which is proportional to the movement of a component. Moreover, a magnetosensitive element is arranged in a gap of the frame and, therefore, in the closed magnetic circuit created by the magnet, the output signal of which magnetosensitive element is proportional to the movement of the magnet. Since the magnet slides directly on the inside of the frame, however, high frictional losses can occur that corrupt the output signal. Since the housing is closed, a varying magnetic flux is produced.

In contrast the measuring instrument according to the invention has the advantage that the magnet-since it is attached to a sled—can execute a sliding movement with relatively low frictional losses. The sled can be designed to be relatively slideable by way of its construction as well as by way of the materials used. Moreover, the sled can be incorporated in the closed magnetic circuit of the magnet in a simple fashion. Due to the conical seating of the sled, the magnet can be inserted and moved without play. The air gap is not affected by the force of the magnet, but rather kept constant during the measuring motion. Fluctuations in the output signal are thereby avoided. The guidance of the support and the attractive forces of the magnet are decoupled. No offset voltage is required with this measuring instrument. The measuring instrument can be easily integrated in systems to be measured, or it can be used as an independent sensor. It is therefore feasible that it can be used in transmission controls, or for measuring pedal travel or valve lift, for example.

Advantageous further developments and improvements of the measuring instrument indicated in Claim 1 are possible as a result of the measures described in the subclaims.

BRIEF DESCRIPTION OF THE DRAWINGS

Embodiments of the invention are presented in the diagram and are explained in greater detail in the description below.

FIG. 1 shows a longitudinal section, and

FIG. 2 shows a section II—II according to FIG. 1.

FIG. 10 shows a section in the direction X—X according to FIG. 9, and FIG. 11 shows a section in the direction XI—XI of FIG. 9.

FIG. 14 shows a section in the direction XIV—XIV according to FIG. 13, and FIG. 15 shows a section in the direction XV—XV of FIG. 13.

DESCRIPTION OF THE PREFERRED EMBODIMENTS

Figure 2:
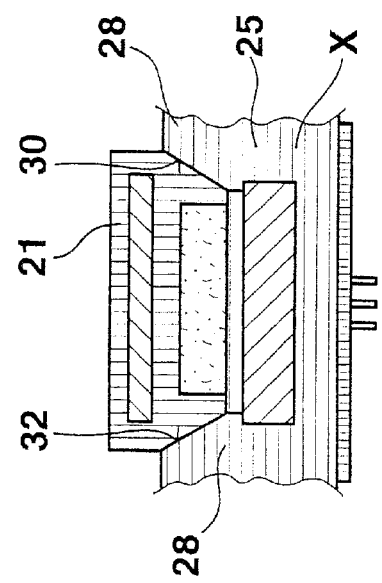
FIGS. 1 and 2 show different views and sections through a first embodiment.
Figure 1:
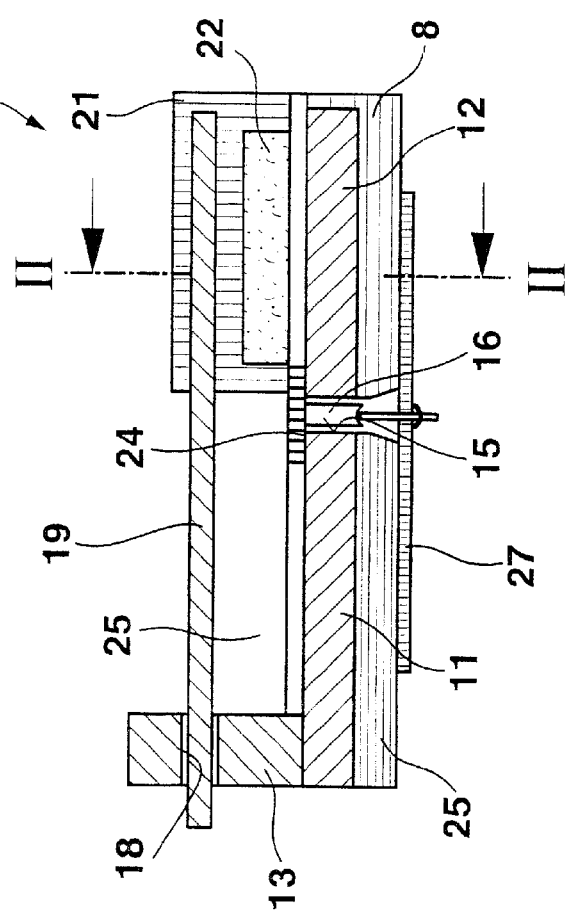

In FIGS. 1 and 2, a measuring instrument is shown as 10 that has a frame made of magnetically soft material and comprising a multipart baseplate 11, 12, and a side wall 13. The baseplate 11, 12 has a passing slot 15 in which at least one magnetosensitive element 16 is situated. A magnetoresistor, magnet transistor, coils, magnetoresistive elements, or a Hall element, for example, can be used as the magnetosensitive element 16 here. A recess 18 is formed in the side wall 13, through which a supporting plate 19 comprised of magnetically soft, i.e., permeable, material extends. A component is attached directly or indirectly to the end of the supporting plate 19 located outside the frame, the movement or travel of which is to be determined. A magnetic holder 21 comprised of magnetically impermeable material is attached to the end of the supporting plate 19 extending into the frame. A permanent magnet 22 is inserted in the magnetic holder 21 in a recess on the side facing the baseplate 11, 12 of the frame. The direction of polarization of the permanent magnet is arranged at right angles to the supporting plate 19 and the baseplate 11, 12. A gap L1 with magnetically impermeable material is formed between the permanent magnet 22 and the baseplate 11, 12. This can be an air gap with the size L1, or the gap can be filled with another magnetically impermeable material. It is possible here, for example, that the permanent magnet 22 is completely enclosed by the magnetic holder 21. In the embodiment according to FIG. 1, the gap 15, in which the magnetosensitive element 16 is located, is closed by a cover 24 on its side facing the supporting plate 19. The frame, i.e., the baseplate 11, 12 and the side wall 13 are enclosed by a housing 25 comprised of magnetically impermeable material. The housing 25 extends upward to just below the slit 18 in the side wall 13. The housing 25 also has a slit in the region of the slit 15, through which the connections of the magnetosensitive element 16 can be fed to a printed circuit board 27 situated on the outside of the housing 25.

As one can see in FIG. 2, the side walls 28 of the housing 25 serve to guide the magnetic holder 21. To this end, the surfaces 30 of the side walls 28 facing the inside of the housing 25 in FIG. 2 are trapezoidal in shape. The surfaces 32 of the magnetic holder 21 facing the surfaces 30 of the side walls 28 are also trapezoidal in shape. As a result of this design of the guide, a relatively frictionless sliding of the magnetic holder 21 in the housing 25 is made possible. Moreover, this trapezoidal shape determines the size of the air gap L1, and it makes a constancy of the air gap L1 possible while the magnetic holder 21 moves in the housing 25.

Figure 7:
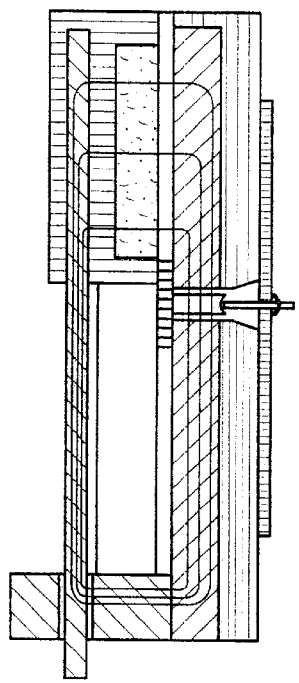
FIG. 7 shows the corresponding magnetic flux at maximum displacement and an induction B=max.
Figure 6:
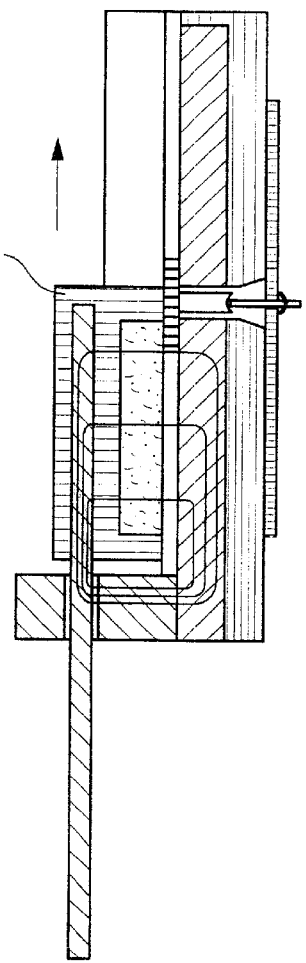
FIG. 6 shows the magnetic flux in an initial position and an induction B=0.
Figure 8:
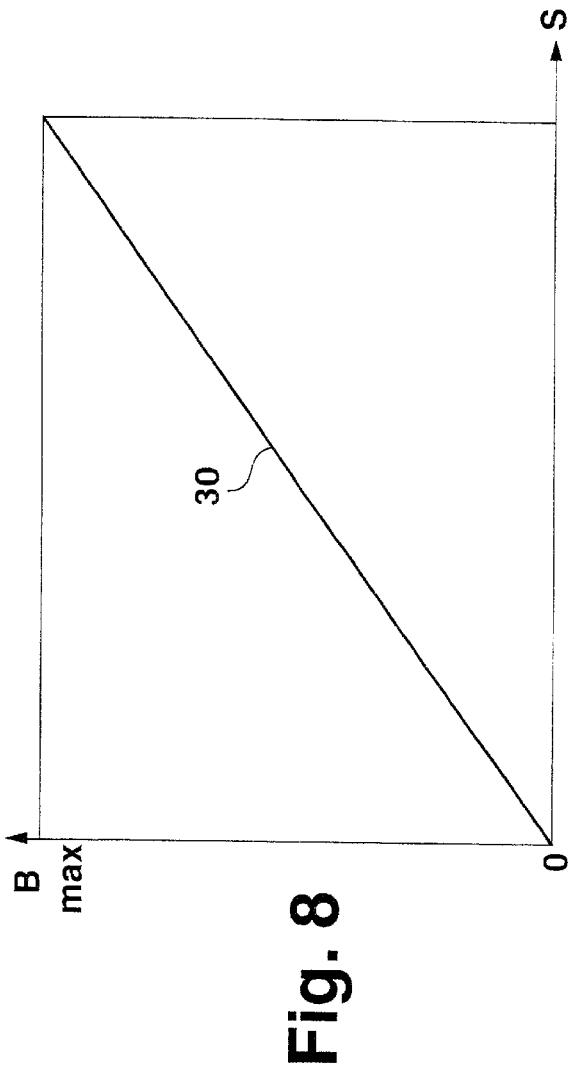
FIG. 8 shows the corresponding course of induction B across the path S.

The permanent magnet 22 is magnetized at right angles to the axis of movement. This means that, depending on the direction of polarization, a magnetic flux is produced that emerges from the permanent magnet 22 and passes through the magnetic holder 21 to the supporting plate 19. From the supporting plate 19, the magnetic flux passes through the gap 18 and the side wall 13 to the part 11 of the baseplate. In the part 11 of the baseplate, the magnetic flux passes over the gap 15 and through the Hall element 16 to the part 12 of the baseplate and over the air gap L1 back to the permanent magnet 22, resulting in a closed magnetic circuit. In FIGS. 6 through 8, the magnetic flux is shown in an initial position (FIG. 6) and in maximum displacement (FIG. 7), and the course of the output voltage, i.e., the magnetic induction B in the magnetosensitive element 16 between the two extreme positions and across the path S, is shown. In FIG. 6, the magnetic holder 21 is located to the left in the diagram, i.e., the front side of the magnetic holder 21 almost touches the side wall 13, out of which the support 19 extends. As one can see in FIG. 6, magnetic flux is not allowed to pass through the magnetosensitive element 16 in this initial position. To ensure that magnetic flux does not pass through the magnetosensitive element 16 in this position, the magnetic holder 21 must be comprised of magnetically impermeable material. In the base position, the magnetic flux therefore emerges from the magnet 22 and passes through the magnetic holder 21, the support 19, the gap 18, the side wall 13 and the part 11 of the baseplate, and over the gap L1 back to the magnet 22. Since this magnetic flux does not pass through the magnetosensitive element 16, the magnetic induction B=0 sketched in FIG. 8 results in this position. Since the sides of the measuring instrument 10 are open, magnetic flux cannot pass from the support 19 to the parts 11 and 12. If the component to be measured, i.e., the support 19 with the magnetic holder 21, is now slid to the right as viewed in the diagram, the magnetic flux that passes through the magnetosensitive element 16 increases continuously. This results in the linear measuring line 30 shown in FIG. 8. At maximum extension, i.e., as shown in FIG. 7, when shifted to the right, i.e., when the magnet 22 is moved over and past the gap 15 and, therefore, the magnetosensitive element 16, the maximum magnetic induction B=max is produced. In this position, the entire magnetic flux of the magnet 22 passes through the magnetosensitive element 16, as illustrated in FIG. 7.

Figure 3:
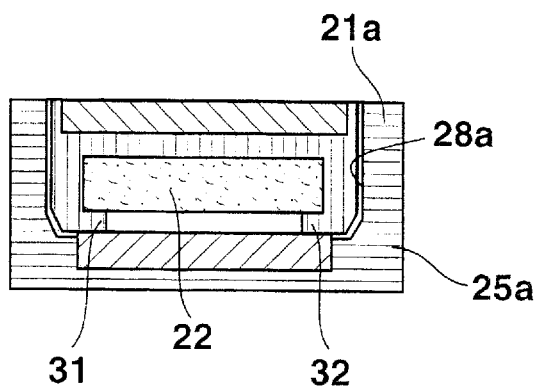
FIGS. 3 through 5 present variants of the sled shown in FIG. 2.
Figure 4:
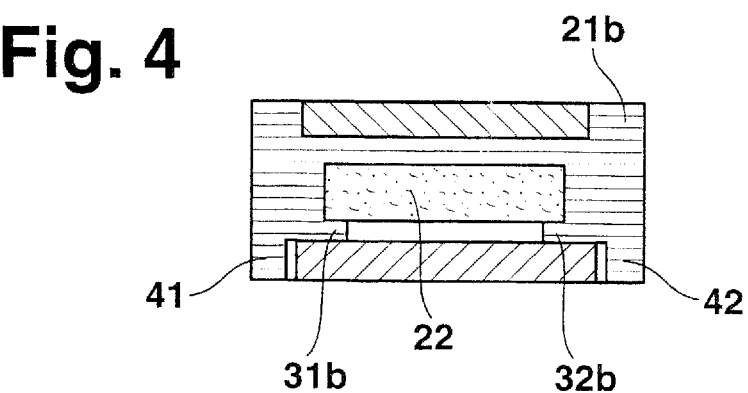
Figure 5:
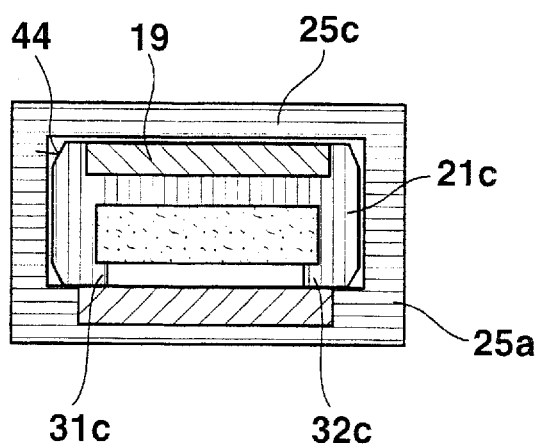

Different designs of the magnetic holder are shown in FIGS. 3 through 5 that make the most frictionless sliding in the housing possible while ensuring constancy of the air gap L1. In FIG. 3, the magnetic holder 21a has vertical side walls 28a. The magnetic holder 21a at least partially encloses the magnet 22 by way of extensions 31, 32. The magnetic holder 21a also lies on the baseplate 11, 12 by way of the extensions 31, 32. The thickness of these extensions 31, 32 also determines the size L1 of the air gap between the magnet 22 and the baseplate. As a result, the air gap L1 cannot be disturbed, i.e., corrupted, by the force of attraction F of the magnet 22 during measurement. The outsides of the magnetic holder 21a are bevelled in the region of the extensions 31, 32, to ensure that the magnetic holder 21a slides as frictionlessly as possible in the housing 25a and on the baseplate. The internal walls of the housing 25a are designed to correspond to the shape of the magnetic holder 21a.

The design of the magnetic holder according to FIG. 4 makes an application possible using a housing enclosing the magnetic holder, as shown in the preceding figures, as well as an application in which only the bottom side of the magnetic holder rests on the baseplate or on a housing. As shown in the design according to FIG. 3, the magnetic holder 21b encloses the magnet 22 with two extensions 31b and 32b. The magnetic holder 21b also rests on the baseplate by way of these extensions 31b and 32b. Moreover, rails 41, 42 are formed on the magnetic holder 21b, which extend parallel to the side wall of the baseplate. The rails 41, 42 hereby serve to guide the magnetic holder 21b on the baseplate; they can also be used—either simultaneously or as an alternative—as a support on a housing located beneath it.

A housing 25c is shown in FIG. 5 that completely encloses the magnetic holder 21c. Additionally, in order to ensure the most frictionless sliding of the magnetic holder 21c possible in the housing 25c, the upper edges 44, i.e., the outside edges of the magnetic holder 21c, are bevelled in the region of the support 19. The magnetic holder 21c can also be used without an external housing, however, because it also rests on the baseplate at least partially by way of the extensions 31c, 32c.

Figure 10:
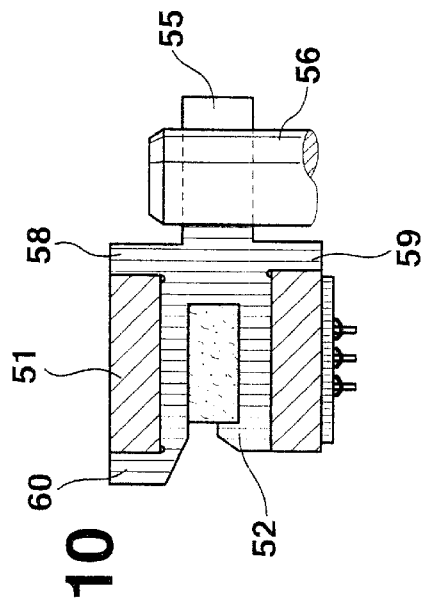
FIGS. 9 through 11 show a second embodiment, whereby
Figure 9:
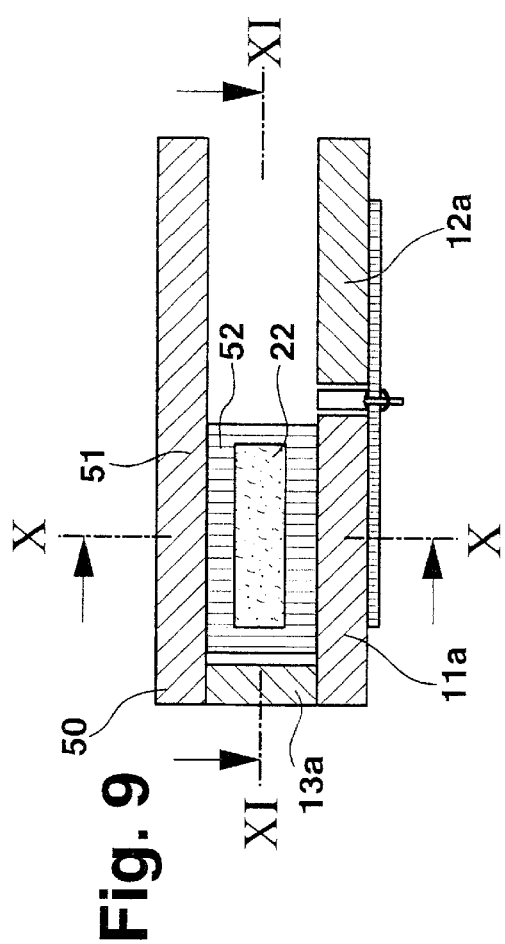
Figure 11:
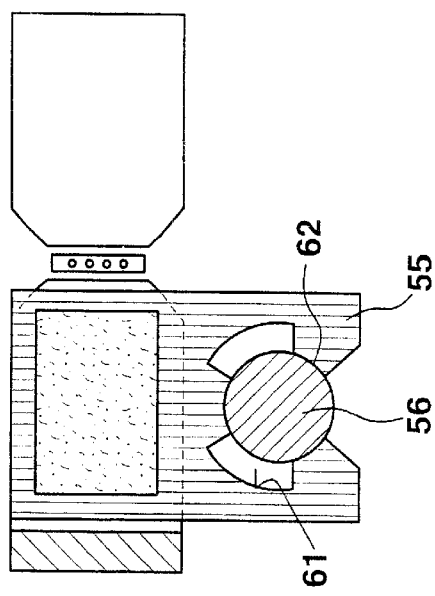

While, in the preceding embodiments, the component to be monitored was located on the end of the support 19 opposite to the magnetic holder 21, the component is now situated at a right angle to the magnetic holder and its direction of movement, so that the direction of movement of the magnetic holder runs parallel to the movement of the component to be monitored. The frame 50 of the instrument according to FIG. 9 has a U-shaped cross-section, is made of magnetically soft material, and comprises the the side wall 13a, a cover 51, and the baseplate—which, in turn, is comprised of the two parts 11a and 12a. A magnetic holder 52 is situated between the cover 51 and the baseplate 11a, 12a, in which the magnet 22 is embedded, and which is shown further in FIGS. 10 and 11 in greater detail. A region of magnetically impermeable material is again located between the magnet 22 and the baseplate 11a, 12a, which region can consist of the magnetic holder 52 as in FIG. 9, or it can be an air gap, as shown in FIG. 1. As one can see in FIG. 10, the magnetic holder 52 comprises a flange-like extension 55 in which a driver 56 is situated that is connected to the component to be monitored, which is not shown. Extensions 58, 59 are formed on the magnetic holder 52 on the side facing the flange 25, with which the magnetic holder 52 abuts against the baseplate or the cover 51. A further extension 60 is also formed on the magnetic holder 52 on the opposite side, which abuts against the longitudinal side of the cover 51. In order to make the sliding of the magnetic holder 52 against or on the baseplate 11a, 12a or against or on the cover 51 as frictionless as possible, undercuts are formed on the bridge to each of the extensions 58, 59, 60.

A recess 61 is formed in the flange 55 of the magnetic holder 52 into which three extensions 62 arranged in the shape of a star extend, which make it possible to fix the driver 56 in the method of a press fit. In order to achieve a concentration of the magnetic flux in the region of the gap 15 between the parts 11a and 12a of the baseplate, the edges are bevelled, so that a concentration of the magnetic flux in the region of the magnetosensitive element 16 takes place.

Figure 12:
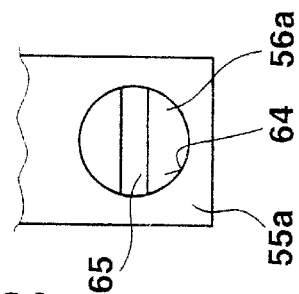
FIG. 12 shows an alternative driver for the embodiment according to FIGS. 9 through 11.

A variant of the attachment of the driver on the magnetic holder is shown in FIG. 12. To this end, a circular opening 64 is formed in the flange 55a of the magnetic holder, through which the driver 56a extends. The driver 56a comprises a slit 65 on its upper end that passes through approximately in the center, so that the segments produced when the driver 56a is guided into the opening 64 deform elastically and, in their end position, fix the driver 56a pressed in the opening 64.

Figure 14:
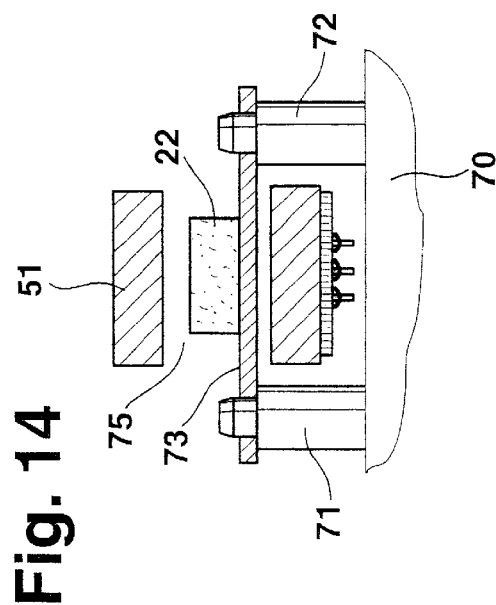
FIGS. 13 through 15 show a third embodiment, whereby
Figure 13:
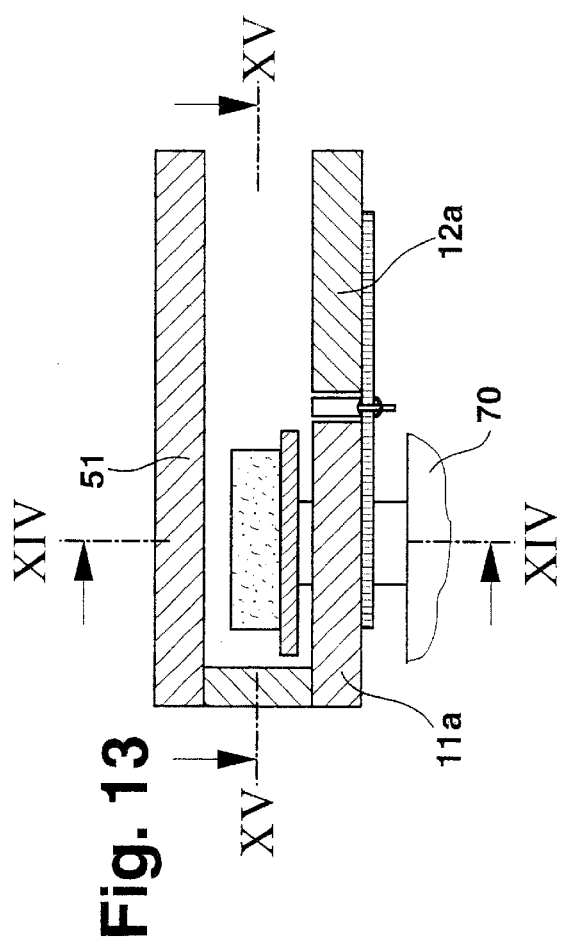
Figure 15:
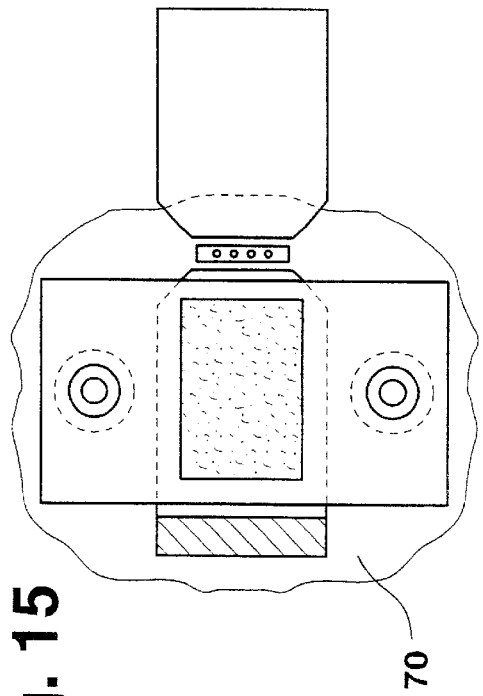

In the embodiment according to FIGS. 13 through 15, a measuring instrument is presented in which the component 70 to be monitored is connected to the magnetic holder 73 comprised of magnetically impermeable material. The magnetic holder 73 is brought into the position by way of at least one spacer (71, 72), in which the magnet lies approximately in the center between the cover 51 and the parts 11a and 12a. The magnetic holder 73 with the magnets 22 is moved contactlessly between the U-shaped frame 50. As in FIG. 9, the frame is designed with a U-shaped cross-section here as well, and is comprised of magnetically soft material. Two columns 71, 72 are situated on a substructure 70, which enclose the baseplate 11a, 12a. A plate 73 comprised of magnetically soft material rests on the columns 71, 72, on which the magnet 22 is situated. The region between the plate 11a, 12a and the cover 51 is again filled by the magnetic holder 75 comprised of magnetically impermeable material.

What is claimed is:

1. A measuring travel instrument, comprising a frame composed of a permeable material; a magnet situated inside said frame in a movable fashion; a magnetosensitive sensor situated in a slot of said frame that is situated in a closed magnetic circuit in such a fashion that a size of a magnetic flux of said magnet changes in it depending on a position of said magnet; a sled composed of a magnetically impermeable material and executing a sliding movement, said magnet being located in said sled; a guide member extending through a recess in a side wall of said frame and connecting said sled with a component a movement of which is to be determined, said guide member being composed of a permeable material and arranged in such a way that it forms a part of said frame conducting the magnetic flux of said magnet.

2. A measuring travel instrument as defined in claim 1, wherein said frame has a side wall, provided with a recess, said guide member being guided in said recess.

3. A measuring travel instrument as defined in claim 1, wherein said frame is open on a front of a side opposite to said side wall.

4. A measuring travel instrument as defined in claim 1, and further comprising a gap composed of a magnetically impermeable material and located between said magnet and said frame.

5. A measuring travel instrument as defined in claim 1, and further comprising a housing; and a wedged-shaped guide provided between said sled and said housing.

6. A measuring travel instrument as defined in claim 1, wherein said sled has a wall which faces said housing and is slanted.

7. A measuring travel instrument as defined in claim 1, wherein said magnet is polarized at right angles to a direction of movement.

8. A measuring travel instrument as defined in claim 1, wherein said sled has extensions with which it at least partially encloses said frame.

9. A measuring travel instrument, comprising a frame composed of a permeable material; a magnet situated inside said frame in a movable fashion; a magnetosensitive sensor situated in a slot of said frame that is situated in a closed magnetic circuit in such a fashion that a size of a magnetic flux of said magnet changes in it depending on a position of said magnet; a sled having a slanted wall, composed of a magnetically impermeable material and executing a sliding movement, said magnet being located in conical seating of said sled; a guide member extending through a recess in a side wall of said frame and connecting said sled with a component a movement of which is to be determined, said guide member being composed of a permeable material and arranged in such a way that it forms a part of said frame conducting the magnetic flux of said magnet.

* * * * *